June 3, 1941.  P. KOTOWSKI  2,244,628
ANTENNA WITH STEERABLE POLARIZATION CHARACTERISTICS
Filed May 6, 1939  2 Sheets-Sheet 1
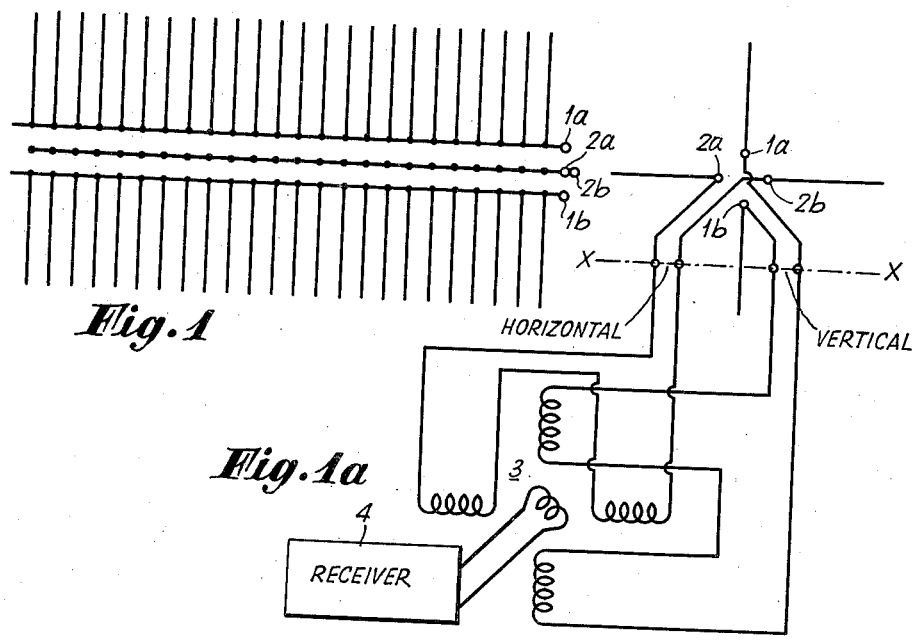
Fig.1
Fig.1a
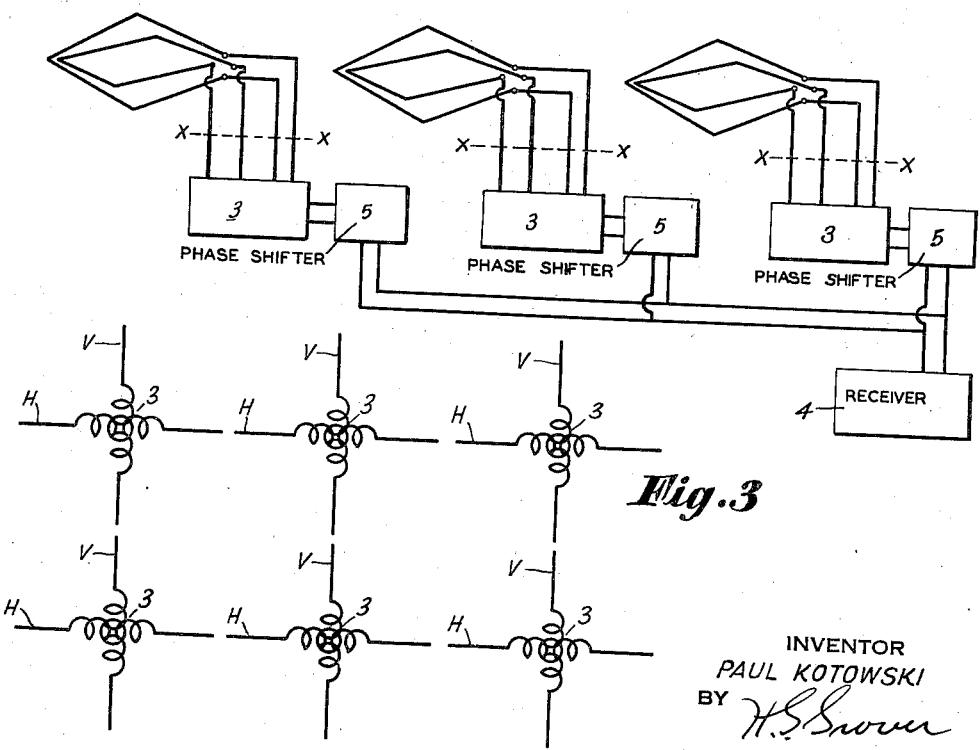
Fig.2
Fig.3
INVENTOR
PAUL KOTOWSKI
BY
ATTORNEY June 3, 1941.  P. KOTOWSKI  2,244,628
ANTENNA WITH STEERABLE POLARIZATION CHARACTERISTICS
Filed May 6, 1939  2 Sheets-Sheet 2

INVENTOR
PAUL KOTOWSKI
BY *H. S. Snover*
ATTORNEY

Patented June 3, 1941

2,244,628

UNITED STATES PATENT OFFICE 2,244,628

ANTENNA WITH STEERABLE POLARIZATION CHARACTERISTICS

Paul Kotowski, Berlin-Tempelhof, Germany, assignor to Telefunken Gesellschaft für Drahtlose Telegraphie m. b. H., Berlin, Germany, a corporation of Germany Application May 6, 1939, Serial No. 272,068
In Germany May 16, 1938

3 Claims. (Cl. 250—11)

It is known that receiving aerials show an increased ratio between signal potentials and noise potentials as their characteristic of response or sensitivity approaches the sense of the incident waves. In the light of this understanding arrangements have of late been developed which possess what has been called a steerable directional characteristic. Such arrangements are adjusted so that their maximum sensitivity is towards the incoming beam (see Proc. Inst. of Radio Engineers, vol. 25, 1937, p. 841). One drawback inherent in such arrangements is the fixed polarization of the equipment with the result that for each incident direction only one definite polarization can be picked up under optimum conditions. Now, the object of the invention hereinafter to be disclosed resides in the heretofore unknown concept of so adjusting the polarization of the receiving structure in each case that it will be in agreement with the particular polarization of the incident wave.

The solution of this problem is predicated upon an antenna system comprising a phase displaced combination of aerials of dissimilar polarization. For this purpose are used adjustable phase shifters so operated that the polarization of the system is adjustable. For instance, two antenna groups may be provided and connected to rotating-field goniometer instruments of a kind known in the prior art. This construction allows the operator to ascertain the optimal direction of polarization in the receiver since the pick-up instrument connected to the antenna is set in the sense where the ensuing voltage presents a maximum value. An equipment heretofore used in the reception of different polarizations consists in the so-called diversity reception method using dissimilarly polarized aerials, though each of these is characterized by a fixed optimum direction of polarization, and they are not steerable. Hence, they fail to result in optimum relationship between signal and noise potentials. Moreover, they involve the shortcoming that they pick up signals coming from widely different directions, with the consequence that fading and signal spread occur.

Figure 4:
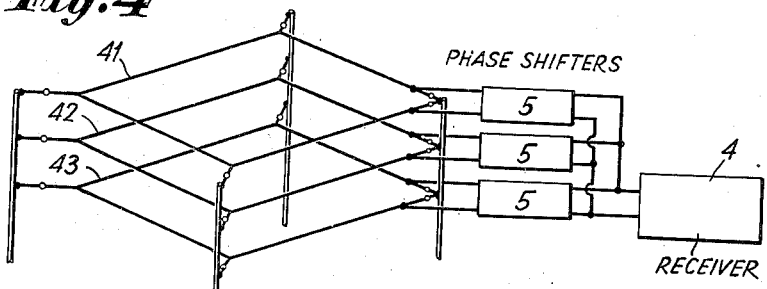
Figure 4A:
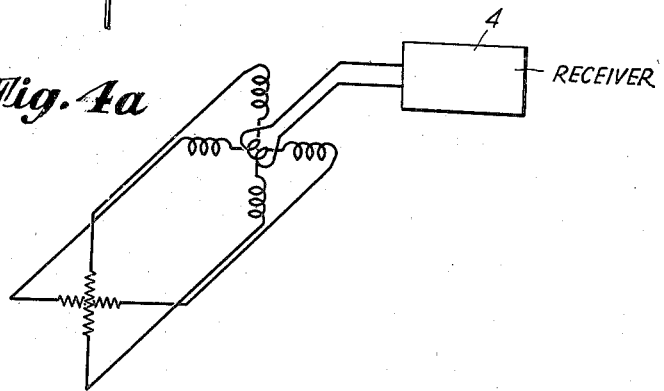
Figure 5:
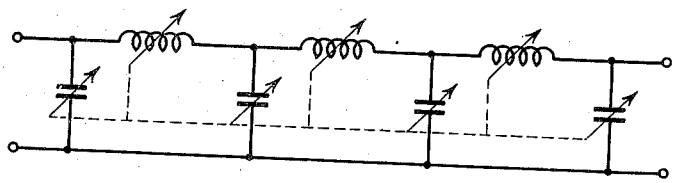
Figure 6:
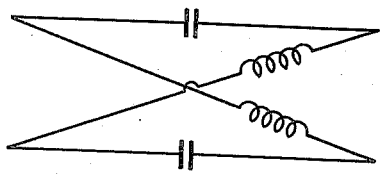

For a more complete understanding of the invention, reference will be had to the following detailed description, which is accompanied by drawings in which Figure 1 shows a plan view of a construction according to the invention, while Figure 1A shows an end view of the same construction with the connections to a receiver; Figure 2 shows an application of my invention to a rhombic antenna system; Figure 3, to a crossed dipole curtain array; Figure 4, to another rhombic antenna system; Figure 4A, to still another type of antenna, while Figures 5 and 6 show diagrammatically delay networks such as used between the elements of Figure 2 in order to obtain an adjustable directivity.

What is shown in Figures 1 and 1A are two of the so-called "fish-bone" antenna; they are a development of the Beverage type of aerial. These antennae are usually arranged for horizontal polarization. According to the invention, two such arrays are mounted cross-fashion and at right angles to each other. The ends of the central conductors, as shown in Figure 1A, are connected with a rotary-field goniometer instrument 3. The latter, as here shown, may be of one of the types well-known from the direction-finding arts, such as a magnetic goniometer or else a capacitive goniometer. The output of the goniometer is connected to a receiver 4. The scheme here shown is adapted to cover a large wave-band. It is understood that this particular scheme is merely shown by way of illustration of the basic idea of the invention, for the same idea is adapted to be carried into practice also with other antenna arrangements. According to a further object of the invention, the means used for the adjustment of the polarization may be combined with spatial steering for the maximum of response or sensitivity. Research has brought out the fact that it is expedient first to choose for the various antenna groups the optimal polarization direction and only thereafter the direction of maximum sensitivity.

Figure 2 represents antennae subject to space polarization at right angles to each other in the form of crossed rhombic aerials resembling a large cross type frame, though it is true that the similarity is merely geometric in nature. The vertical rhomb, as will be noted, preferably has a smaller apertural angle than the horizontal rhomb in accordance with the fact that the angle of deviation of the incident radiation or beam compared with the great circle is usually smaller than that of the horizontal (say, 2 in lieu of 12 degrees). For each pair of aerials the optimal direction of polarization is thereupon selected, and for the assembly and combination of all antenna arrays the optimal directional characteristic is determined as known in the art. The combination for polarization of each pair is effected as shown in Figure 1A, wherein the portion below line X—X is added to each of the antenna pair of Figure 2, whereas the combining of the output of goniometers 3 is effected in a manner of the so-called "Musa" or multiple unit steerable antenna receiver through phase shifters 5.

A further exemplified embodiment of the invention is illustrated in Figure 3 as applied to the well-known wall (curtain) of crossed dipoles comprising pairs of vertical dipoles V and horizontal dipoles H. Each pair of dipoles works in conjunction with a goniometer 3 whereby the pair may be adjusted to any definite polarization. The sum total of these dipole pairs may then be composed with any desired phase displacement by phase shifters as used in Figure 2. It is thus feasible to adjust for any definite direction of reception. The choice and the setting of the polarization plane and the direction of reception may be accomplished either manually or else automatically, the latter being preferable.

The number of single or constituent serials required according to the invention may be accommodated inside a reduced space if, as illustrated in Figure 4, according to a further object of the invention, rhombic aerials 41, 42, 43, are mounted in superposed relationship. The output of each antenna is coupled to the receiver through phase shifters. Such arrangements consisting of superposed rhombic aerials offers the special advantages as regards the selection of certain directions of reception. They represent a steerable antenna system which insures the advantages of the "USA" system, while yet requiring appreciably less space. This arrangement does not, however, offer the further advantages of variable polarization as is the case with the antennae previously described.

Figure 4A illustrates another system which is adapted to carry the basic idea of the invention into practice. It consists of two long-wire antenna systems stretched out in planes at right angles to each other. They are mounted on telegraph masts or the like along the surface of the earth. Instead of the rhombic form the individual antenna could also be rectangular in form. Great numbers of systems of this kind are adapted to be placed adjacent one another or in juxtaposition, and in addition to steering the polarization which is feasible with the various systems, they also permit steering the direction of the incoming signals. The corners where the various aerials abut or join may consist of joint and common wires or else by distinct wires. The antennae of this figure may also be mounted in series, that is, one behind the other, as shown for Figure 2.

As illustrations how to carry the basic idea of the invention into effect in a simple way, especially for forming the steerable directional characteristic, a number of circuit organizations shall be described in what follows which are designed to obtain a de-phased antenna combination by mesh chains which compared with one another are made up of similar links or meshes. As a means to insure steering recourse is had to inductance variation by means of a conventional variometer or a short-circuit variometer, or to capacity variations with a rotary condenser, or both conjointly. In an arrangement of the kind illustrated in Figure 5 which represents a low-pass filter, the assumption is made that all variable inductances and capacities are seated upon a common shaft. If the inductances and the capacities are varied simultaneously in the same sense, then the matched impedance of the assembly remains constant and stable inside a wide wave-band. But the transit time of the electrical waves in each mesh or unit of the chain may be varied at will by variation of the electrical constants. It is preferable to arrange sufficient meshes between pairs of chains so that the feasible range of variation results in a complete circle. Suppose the variation of transit time per mesh, for instance, is only at the ratio of 2:3: then enough meshes must be interposed between two antenna connections that the phase shift in these meshes will be at least 720 degrees. The range of variation will then allow to raise this angle to 1080 degrees so that an aggregate angle of 360 degrees may be covered. For this purpose, as a general rule, from two to four meshes will suffice. Instead of a low-pass filter recourse could be had also to a high-pass filter. However, as shown in Figure 6, it is also possible to use a lattice-section type of filter which with limited circuit means allows a large phase shift per mesh. If from one antenna array several receiving circuits are to be operated on the same or on different waves, it will be necessary to arrange amplifier tubes ahead of the combination elements in order that the various receiver paths being thus separated by these isolating tubes from the antenna, will be unable to react upon the antenna. In addition to these receiving paths, a seeker path should preferably be provided designed constantly to find the possible aggregate angular range of the polarization and the directional characteristic for the maximum points. Adjustment to maximum signal strength is accomplishable both by hand as well as automatically.

I claim:

1. A directional aerial system comprising a plurality of aerial groups, each of said groups comprising elements individually responsive to horizontally and to vertically polarized energy, means for combining the output from said elements in an adjustable phase relationship whereby the resultant polarization response of each group is variable and means for combining the output of all of said groups into a single receiver, the phase of the energy from each group being separately adjustable with respect to the other groups whereby the directivity of said system is variable.

2. A directional aerial system comprising a plurality of aerial groups, each of said groups comprising horizontal and vertical dipole aerial elements, a goniometer for combining the output from said horizontal and vertical dipoles of each group in an adjustable phase relationship whereby the resultant polarization response of each of said groups is variable and means for combining the output of all of said groups into a single receiver, the phase of the energy from each group being separately adjustable with respect to the other groups whreby directivity of said system is variable.

3. A directional aerial system comprising a plurality of aerial groups, each of said groups comprising a pair of rhombic antennae in planes at right angles to each other, a goniometer for combining the output from said antennae in an adjustable phase relationship whereby the resultant polarization response of each of said groups is variable and means for combining the output of all of said groups into a single receiver, the phase of energy from each group being separately adjustable with respect to the other groups.

PAUL KOTOWSKI.